(12) United States Patent
Finzelberg

(10) Patent No.: US 9,743,694 B2
(45) Date of Patent: Aug. 29, 2017

(54) PROTECTIVE GLOVE

(76) Inventor: Mattias Finzelberg, Mannheim (DE)

( * ) Notice: Subject to any disclaimer, the term of this patent is extended or adjusted under 35 U.S.C. 154(b) by 736 days.

(21) Appl. No.: 14/117,904

(22) PCT Filed: May 10, 2012

(86) PCT No.: PCT/EP2012/002005
§ 371 (c)(1),
(2), (4) Date: Jan. 28, 2014

(87) PCT Pub. No.: WO2012/156046
PCT Pub. Date: Nov. 22, 2012

(65) Prior Publication Data
US 2014/0289926 A1  Oct. 2, 2014

(30) Foreign Application Priority Data
May 17, 2011  (DE) .......................... 10 2011 101 800

(51) Int. Cl.
A41D 19/00    (2006.01)
A41D 19/015   (2006.01)
A62D 5/00     (2006.01)
C08J 5/02     (2006.01)
B29D 99/00    (2010.01)

(52) U.S. Cl.
CPC ..... *A41D 19/0006* (2013.01); *A41D 19/0058* (2013.01); *A41D 19/01529* (2013.01); *A62D 5/00* (2013.01); *B29D 99/0067* (2013.01); *C08J 5/02* (2013.01)

(58) Field of Classification Search
CPC . A41D 19/00; A41D 19/015; A41D 19/01529
See application file for complete search history.

(56) References Cited

U.S. PATENT DOCUMENTS 5,119,515 A      6/1992  Altinger
2009/0068443 A1* 3/2009  Curtet ................ A41D 19/0055
                                                         428/332

FOREIGN PATENT DOCUMENTS

DE        23 30 316 A1      1/1974
FR           92518 E       11/1968
WO      WO 96/23 428 A1     8/1996
(Continued)

OTHER PUBLICATIONS

PCT International Search Report and Written Opinion, PCT/EP2012/002005, Filed: May 10, 2012 9pgs.
(Continued)

*Primary Examiner* — Brian P Mruk
(74) *Attorney, Agent, or Firm* — Reising Ethington PC

(57) ABSTRACT

The present disclosure relates to a protective glove, which has different polymer layers arranged in a multi-layered polymer composite material. According to the present disclosure, the protective glove contains polyvinyl alcohol and a protective layer on top of this containing a fluorinated elastomer. The present disclosure also relates to a method for manufacturing a protective glove of this kind. The combination of various polymers and their arrangement in the polymer composite material achieve a powerful protective action against a multitude of chemical compound classes while simultaneously producing advantageous mechanical properties.

18 Claims, 2 Drawing Sheets

(56) References Cited

FOREIGN PATENT DOCUMENTS

WO      WO 00/09590      2/2000
WO      WO 02/080713 A2      10/2002

OTHER PUBLICATIONS

German Office Action from parallel German Application 10 2011 101 800.3, Dated: Apr. 23, 2012.
English Translation of Int Preliminary Report on Patentability, Int. Application No. PCT/EP2012/002005, Int. Filing Date: May 10, 2012, Mail Date: Nov. 19, 2013.

\* cited by examiner

PROTECTIVE GLOVE

TECHNICAL FIELD

The present disclosure relates to protective gloves that are composed of an elastic, multi-layered polymer composite material—in particular protective gloveas of protection class 3 according to the standard DIN 61140- and their use as well as a method for their manufacture.

BACKGROUND

The polymer layers of a protective glove constitute barrier layers. The protective effect, i.e. the ability of the protective glove to protect against a chemical depends on the permeability, i.e. on the permeation process. This process includes the steps of adsorption, diffusion, and desorption. While adsorption processes between the chemical and the polymer affect the degree of swelling and dissolving or solubilization of the polymer surface, the diffusion rate determines how quickly the respective chemical permeates the polymer layer. The total velocity of all of the permeation steps is defined as the permeation rate. The permeation time, also referred to as breakthrough-time, is the amount of time from the contact of the chemical with the polymer surface until it permeates through the barrier layer; it serves as a measure for the protective effect of the respective layer. Accordingly, polymers that have a long permeation time for a certain chemical offer a good protection against the relevant compound over a comparatively long period of time. On the one hand, the permeation time depends on the structure of the polymer; nonpolar polymers tend to have long permeation times for polar solvents and polar polymers tend to have long permeation times for nonpolar solvents. Due to the availability of a multitude of suitable polymers, in particular elastomers, protective gloves are available for a large number of chemical substance classes. In the context of the present disclosure, an elastomer is understood to be a cross-linked, flexible polymer. Corresponding polymers without cross-linking or with only a low degree of cross-linking are referred to as rubbers (see standard DIN 53501). A protective glove composed of only one polymer is only resistant to a narrow range of chemicals. It is desirable, however, for a protective glove to have long permeation times for the largest possible number of chemical substance classes and thus to offer the user a broad range of protection. In practice, this is achieved through the use of composite materials composed of a plurality of polymers with different physical and chemical properties. Thus protective gloves composed of cross-linked butyl rubber and fluororubber have a favorable resistance to both nonpolar solvents such as aliphatic hydrocarbons and polar solvents such as alcohols. A polymer composite material of this kind, however, does not cover all chemical substance classes. It is not possible, for example, to provide satisfactory protection from chlorinated hydrocarbons and ethers such as tetrahydrofuran. By contrast with the above-described polymer composite materials, mixed layers such as polymer blends do not offer any comparable synergistic effects with regard to their protective effect.

Polar polymers such as polyvinyl alcohol (PVA) offer good levels of resistance to nonpolar chemicals such as chlorinated hydrocarbons, aromatics, and ethers. In particular, PVA is one of the few polymers that do not swell or dissolve when exposed to polychlorinated hydrocarbons such as chloroform or aliphatic ethers such as tetrachloroethane and therefore have long permeation times for these compounds. However, PVA has a low resistance to polar chemicals such as low-molecular alcohols, esters, or ketones. The greatest challenge in dealing with PVA lies in its water solubility and its sensitivity to hydrolysis. This can be reduced on the one hand through cross-linking. PVA can also be stabilized by a high degree of hydrolysis grade, i.e. by means of the share of hydroxyl groups in the polymer. Consequently, a high degree of hydrolysis grade results in larger crystalline domains within the polymer, which are more difficult to dissolve than amorphous regions. However, the degree of hydrolysis grade and the degree of cross-linking reduce the elasticity of PVA, which is disadvantageous when it is used in protective gloves. An extensive stabilization of PVA without reducing the flexibility is thus at the very least difficult if not impossible.

The published, unexamined patent application DE 2,330,316 discloses a protective glove that is made of a composite material composed of PVA and a rubber and, by means of the PVA layer, also provides protection against aromatics and chlorinated hydrocarbons. The PVA forms a film on the rubber; the inside of the glove is formed by the rubber layer and is intended to protect the user of the protective glove from moisture. The problem with this design is that the PVA hydrolyzes over time. Patent disclosure document DE 2,759,008 A1 describes a protective glove that is composed of a woven textile—which, by means of a dip-coating process, has been coated with polymers such as polyvinyl chloride (PVC) or polyvinyl alcohol (PVA)—as well as a method for its manufacture and the apparatus designed for this purpose. Such a glove, however, is only resistant to a narrow range of chemical substance classes.

The document WO 02/080,713 A2 describes a protective glove composed of a polymer composite material that contains PVA. The PVA is in the form of a gel and is embedded between two elastomer layers. The layers are applied through coagulation, i.e. through precipitation of particles from dispersions with the aid of flocculants. The layer over the PVA functions as a moisture barrier and is composed of a synthetic rubber such as carboxylated nitrile rubber. No details about the protective effect are specified.

The patent application US 2009/0,068,443 A1 discloses a protective glove composed of a polymer composite material containing PVA. The PVA layer is protected from moisture by a subsequent rubber layer, but layers of adhesive are used. In order to increase the mechanical and chemical resistance, a resin based on a dispersion of polytetrafluoroethylene (PTFE) and $SiO_2$ is also provided as a top layer. A resin of this kind is disadvantageously inflexible. In addition, the protective glove is produced by means of a dip coating process, where it is dipped into dispersion, which is disadvantageous insofar as the precipitation of the polymer requires the use of precipitants.

GENERAL DESCRIPTION OF THE PRESENT DISCLOSURE

An object of the present disclosure may include creating a protective glove that offers a high level of protection from a multitude of chemical compound classes and has a high mechanical and thermal resistance while maintaining flexibility and wearing comfort. Another object of the present disclosure may include creating a method for manufacturing a protective glove of this kind.

One or more of the objects may be attained by the subject matter of the independent claims. Other embodiments and modifications are disclosed in the respective dependent claims.

Accordingly, the present disclosure provides a dipped protective glove made of a polymer composite material, which includes a laminate with a first and second polymer layer, a hydrophilic polymer layer containing PVA as a third polymer layer, and a fourth polymer layer containing an elastomer with 1,1-difluoroethylene monomer units (vinyl fluoride monomer units). The polymer composite material, also referred to below merely as the composite material, is constructed in such a way that the hydrophilic polymer layer containing PVA, also referred to as the PVA layer, is disposed or situated over the laminate, also referred to as a layered composite, and the fourth polymer layer is disposed over the PVA layer. In this case, the layer that constitutes the inside of the glove is referred to as the bottom (innermost) layer and hence the other layers are disposed over it, i.e. on the outside of the glove as worn by the user.

At least the first, second, and fourth polymer layer are thus produced by means of a dip-coating process from a solution. The laminate contains a first and second polymer layer composed of different synthetic elastomers. An elastomer is understood to be a cross-linked rubber. The fact that cross-linking elastomers increases their mechanical resistance is not unknown to the person skilled in the art. In the present invention, however, the cross-linking also selectively reduces the permeation rate within the cross-linked polymer layers. This extends the permeation times and thus increases the protective effect with constant layer thicknesses. The quantitative distinctness of this effect is proportional to the degree of cross-linking of the elastomer. The parameters of curing time, curing temperature, or pressure during the vulcanization process can be used to influence the degree of cross-linking of the elastomer. The protective effect of the glove can therefore not only be determined through selection of the polymers used and selection of their layer thicknesses. Rather, the degree of cross-linking of the individual polymer layers constitutes an additional available parameter for influencing permeation times. The design of the composite material according to the present disclosure thus makes it possible to manufacture protective gloves with long permeation times, flexibility, and tactile sensitivity. For example, the protective effect of thin layers can be increased, i.e. material can be saved while maintaining the same protective effect, and thus a particularly flexible, thin protective glove can be achieved. It is likewise possible to increase the protective effect by cross-linking while maintaining the same material thickness so that it is possible, for example, to produce protective gloves with a particularly high degree of protective effect, which would be less flexible without the corresponding degree of cross-linking.

The present disclosure generally relates to protective gloves that have a low degree of permeability and thus a high degree of protective effect against both polar and nonpolar chemicals.

In a modification of the present disclosure, the first and second polymer layers are jointly vulcanized. This is advantageous since the adhesion of the second polymer layer to the first polymer layer of the laminate is more effective when the first polymer layer has not yet been cross-linked.

In a preferred embodiment, the self-cross-linked elastomer of the first polymer layer is a copolymer composed of isobutene and isoprene, for example a cross-linked butyl rubber (IIR). The second and/or fourth polymer layer is composed of a fluorinated elastomer. Fluorophobic interactions lead to a high chemical resistance and a high resistance of the second polymer layer, even at temperatures of up to 200° C. In these categories in particular, fluorinated elastomers outperform universal rubbers such as chlorinated rubbers or nitrile rubbers. Fluoroelastomers, however, provide only a limited resistance to strong bases. The degree of resistance increases with the fluorine content of the elastomer, but the flexibility decreases at the same time. Whereas for example copolymers composed of 1,1-difluoroethene and hexafluoropropene (according to IUPAC 1,1,1-trifluoro-(2,3,3-trifluoro)prop-2-ene) with a fluorine content up to 66% still show typical properties of an elastomer, the linear, semi-crystalline homopolymer polytetrafluoroethylene (PTFE), for example, is no longer considered an elastomer due to its low flexibility and, despite the fact that it is a thermoplastic, exhibits a behavior of thermoset materials, which makes it harder to process and handle. In particular, the plastic—i.e. non-elastic—properties limit the use of closed PTFE layers in protective gloves. Hence, the selection of the respective fluoroelastomer therefore takes into account both the mechanical properties and the need for chemical resistance.

An elastomer with isobutene and isoprene monomer units as the first polymer layer offers a good protective effect against polar solvents and against acids and bases. Its low glass temperature $T_g$ results in a very good flexibility, even at low temperatures. Furthermore, it has a low gas permeability, i.e. it is impermeable for a multitude of gases such as hydrogen chloride or ammonia. The comparatively high permeability of the elastomer with isobutene and isoprene monomer units of the first polymer layer for greases, oils, and fuels is compensated for by combining it with the second polymer layer. Consequently, the laminate provides a protective effect against most organic solvents, acids, bases, and aqueous media.

The third polymer layer according to the present disclosure contains PVA, which, due to its polar hydroxyl groups, is resistant to nonpolar compounds such as ethers, aromatics, and chlorinated hydrocarbons and has very long permeation times for these compounds. The PVA layer therefore constitutes a barrier layer, in particular against nonpolar compounds. The composite therefore offers a powerful protective effect particularly against ethers and chlorinated solvents. PVA is not an elastomer and therefore has only a low degree of flexibility, which among other things, depends on the crystallinity and therefore on the degree of hydrolysis. With an increasing degree of hydrolysis and/or cross-linking, the stability of the PVA layer increases while its flexibility simultaneously decreases. In order to be used in a protective glove, however, a barrier layer must also have a sufficient degree of flexibility in addition to its protective effect.

According to the present disclosure, the PVA-containing third polymer layer in the composite material is protected from moisture by the fourth polymer layer that is disposed or arranged over it. This design of the composite material therefore permits the use of PVA regardless of its degree of hydrolysis or cross-linking since it is not necessary to stabilize the PVA layer. As a result, the PVA layer remains sufficiently flexible, thus avoiding cracking during use, which would reduce the protective effect.

Due to their hygroscopic properties, films composed of PVA contain water, which acts as an inner plasticizer to enhance flexibility. It is thus possible to use PVA in the protective glove. The fourth polymer layer ensures that the PVA layer does not dry out and become brittle, thus constituting a moisture protection layer for the PVA layer in both directions (drying or moistening).

In a modification of the present disclosure, the PVA layer contains plasticizers such as for example glycerin, thus improving the elasticity. The PVA layer is a polymer layer dip-coated from a solution, since such a dip-coating process from a solution produces a more uniform PVA layer than, for example, a spray coat methods.

The fourth polymer layer contains a synthetic elastomer and protects the polyvinyl alcohol of the third polymer layer from moisture and drying. In addition, the fourth polymer layer increases the protective effect of the composite material both quantitatively by increasing the total permeation time and qualitatively through its chemical resistance. The fourth polymer layer also has a positive effect on the mechanical stability of the composite material so that it is possible to dispense with additional layers, in particular adhesive layers, within the composite material. The fourth polymer layer therefore performs a multiple function.

In a preferred embodiment, the fourth polymer layer contains a fluorinated elastomer. Repulsive, i.e. repellent, interactions sharply reduce an adsorption of molecules on the layer surface and increase the resistance to a large number of chemical substance classes.

The layer sequence of the polymer composite material according to the present disclosure makes it possible to achieve a protective effect that is greater than the sum of the protective effects of the individual polymer layers of the composite material.

In a preferred embodiment of the present disclosure, the second and/or fourth polymer layer contain(s) an elastomer with 1,1-difluoroethylene monomer units. Fluoroelastomers with 1,1-difluoroethylene monomer units are inert relative to many chemicals, oils, and fuels and are also heat resistant. The high tear strength of up to 20 MPa of fluororubbers with 1,1-difluoroethylene monomer units also results in a high mechanical resistance of the polymer composite material.

In another embodiment of the present disclosure, the second and/or fourth polymer layer contain(s) a copolymer with the monomers 1,1-difluoroethylene and hexafluoropropene. In the context of the present disclosure, copolymers are understood to be polymers with two or more different monomer units. In another embodiment of the present disclosure, the second and/or fourth polymer layer contain(s) a terpolymer with the monomers 1,1-difluoroethylene, hexafluoropropene, and tetrafluoroethylene.

Copolymers with the monomers 1,1-difluoroethylene and hexafluoropropene can be used across a wide range of temperatures. Thanks to glass temperatures $T_g$ in the range from −10 to −30° C., the corresponding polymers remain elastic even at low temperatures. Copolymers with 1,1-difluoroethylene and hexafluoropropene can withstand long-term exposure to temperatures of up to 200° C. and temperature peaks of greater than 300° C. In addition, these copolymers are not flammable. In another modification, at least the fourth polymer layer contains a copolymer with the monomers 1,1-difluoroethylene and hexafluoropropene. As a result, the protective glove is flame-resistant as defined by the standard ASTM F1358, regardless of whether the underlying polymer layers are flammable.

In particular, the present disclosure permits the protective glove to be used for protection against heat or cold or as a firefighting glove.

In another modification of the present disclosure, the first polymer layer contains a halogenated, in particular brominated, elastomer. Halogenated elastomers exhibit a greater chemical resistance and heat resistance than their corresponding halogen-free derivatives. In addition, chlorinated and brominated elastomers have glass temperatures $T_g$ as low as −70° C., i.e. they remain flexible even at low temperatures. Moreover, chlorinated and brominated rubbers are easier to cross-link. In a further modification of the present disclosure, the first polymer layer contains halogenated elastomers with bromobutyl monomer units. This can, for example, be a bromobutyl rubber (BIIR). Bromobutyl monomer units are understood to be the repeating units I, II, and III.

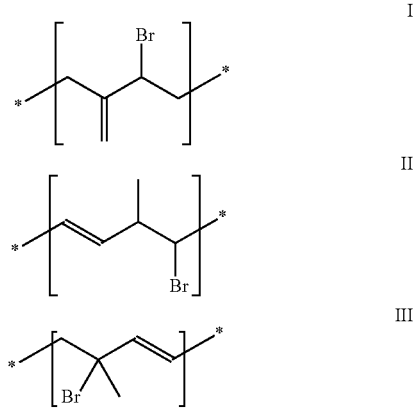

Due to the reactive allylic position of the bromine atoms in the elastomer, it is particularly easy to cross-link bromobutyl elastomers, which permits a high degree of cross-linking. In combination with the high resistance of the bromobutyl elastomer, for example to polar solvents, acids, bases, and aqueous media, it is thus possible to further reduce the permeability of the first polymer layer.

In order to be able to make optimal use of the exceptional inertness of fluorinated elastomers, according to a preferred embodiment of the present disclosure, the second polymer layer in the lamiante is situated over the first polymer layer. This minimizes a swelling or dissolving of the polymer layers, which has an advantageous effect on the permeation times and service life of the protective glove. According to a design of the laminate that is particularly advantageous in terms of the protective action and mechanical properties, the first polymer layer contains an elastomer with bromobutyl monomer units and the second polymer layer contains an elastomer with the monomers 1,1-difluoroethylene and/or hexafluoropropene.

The protective glove according to the present disclosure has particularly advantageous properties in terms of permeability times, flexibility, and mechanical resistance if the fourth polymer layer of the composite material has a layer thickness of 0.01 to 0.05 mm, the third polymer layer of the composite material has a layer thickness of 0.05 to 0.15 mm, the second polymer layer of the composite material has a layer thickness of 0.05 to 0.2 mm, the first polymer layer of the composite material has a maximum layer thickness of 0.6 mm, and/or the laminate has a layer thickness of 0.1 to 0.8 mm. Flexibility, tactile sensitivity, and wearing comfort of the protective glove decrease as the overall thickness of the composite material increases. For this reason, according to yet another embodiment of the present disclosure, the composite material is constructed so that all layers of the composite material contribute to an increase in the permeability time; their contribution of the layers of the composite material goes beyond an increase in the diffusion cross-section of the composite material, unlike the contribution of layers that are provided purely for mechanically stabilizing the material, e.g. adhesive layers. Thus, in one embodiment of the protective glove, the PVA layer is disposed onto the laminate without adhesives and/or the fourth polymer layer is disposed onto the PVA layer without adhesives.

In order to increase the chemical and mechanical resistance of the fourth polymer layer, it is advantageous to cross-link it. A maximum curing temperature of 100° C. results in a cross-linking of the fourth polymer layer while maintaining the elasticity of the PVA layer and determines the degree of cross-linking of the fourth polymer layer. Consequently the fourth polymer layer is in fact cross-linked, but has a lower degree of cross-linking than the first and/or second polymer layer.

The individual polymer layers constitute barrier layers. It is known that the permeation time of barrier layers is reduced by diffusion channels, so-called "pin holes." In order to minimize this effect, one embodiment provides a multiply dip-coated protective glove in which at least one of the first, second, third, or fourth polymer layers is embodied in the form of a multiply dipped composite material that is respectively composed of two or more sublayers of the same polymer. In another embodiment of the protective glove, the first polymer layer is composed of 4 to 6 separately dipped sublayers, the second polymer layer is composed of 3 to 5 separately dipped sublayers, the third polymer layer is composed of 2 to 5 separately dipped sublayers, and/or the fourth polymer layer is composed of 2 to 5 separately dipped sublayers. In order to ensure a uniform layer thickness and protective action over the entire area of the glove, artifacts such as bubbles should be avoided.

The manufacturing process is composed of at least the following steps:

In a step a), a glove form is dipped into a first solution of a synthetic first rubber to produce a first polymer layer. In order to prevent a cross-linking of the rubber either in the solution or immediately after removal of the form, the temperature $T_1$ during the dip-coating process is lower than the cross-linking temperature of the first rubber. After a predefined dipping time, the glove form is removed from the first solution (step b)) and the dipped first polymer layer is dried (step c)). The steps a) through c) are carried out once in sequence or are carried out several times to produce several sublayers.

In a step d), the glove form is dipped into the solution of a second synthetic rubber, different from the first rubber, to produce a second polymer layer. In order to prevent a premature cross-linking of the second rubber, the dipping temperature $T_2$ is lower than the cross-linking temperature of the second rubber. After a predefined dipping time, the glove form is removed from the second solution in a step e). In the next step f), the second polymer layer is dried. The steps d) through f) are carried out once in sequence or are carried out several times to produce several sublayers. In the next step g), the first and second polymer layers are vulcanized under pressure. A temperature of less than 230° C. during the autoclaving procedure is advantageous since this prevents a decomposition of the first polymer layer in particular. After the autoclaving procedure, the glove form cools. In the next step h), the PVA layer, which constitutes the third polymer layer, is produced by dipping the glove form into a PVA solution, which constitutes the third solution. After a predefined dipping time, the glove form is removed from the third solution (step i)) and is dried in the next step j). A maximum temperature of 100° C. during the drying process ensures that the PVA layer retains its elasticity. The steps h) through j) are carried out once in sequence or are carried out several times in sequence to produce several sublayers. In order to produce a fourth polymer layer, in step k), the glove form is dipped into a fourth solution of a fourth rubber. The dipping temperature $T_4$ is lower than the cross-linking temperature of the fourth rubber. After a predefined dipping time, the glove form is removed from the fourth solution in a step l) and is dried (step m)); steps k) through m) are carried out once in sequence or are carried out several times in sequence to produce several sublayers. In step n), a cross-linking of the fourth polymer layer takes place. The maximum curing temperature of 100° C.—preferably of about 80° C.—in step n) permits a cross-linking of the fourth polymer layer without causing the PVA layer to become brittle by drying out. As a result, the PVA layer retains its elasticity. Then, the protective glove is removed from the glove form (step o)).

The rubber of the first solution is preferably a halogenated rubber. In a particularly preferred embodiment, the first rubber contains bromobutyl monomer units.

In a preferred embodiment of the present disclosure, the rubber of the second solution contains a fluorine-containing monomer. Particularly suitable candidates for second rubbers include rubbers with 1,1-difluoroethylene as a monomer unit. In a particularly preferred modification of the present disclosure, the manufacturing process provides a second rubber solution whose rubber contains 1,1-difluoroethylene and hexafluoropropene monomer units.

The vulcanization of the first and second polymer layers of the laminate occurs at a pressure of 3 to 5 bar and/or at a temperature of 60 to 230° C. Preferably, the first and second polymer layers of the laminate are jointly vulcanized in step g). In addition to process engineering advantages such as time and energy savings, a joint vulcanization provides the laminate with greater adhesion forces and therefore a greater mechanical stability.

A particularly uniform PVA layer as the third polymer layer is achieved if the temperature of the PVA solution during the dip-coating process is in the range of 40 to 100° C., preferably 60 to 95° C., and particularly preferably from 70 to 85° C. The production of artifacts such as bubbles on the surface of the glove can be avoided by reducing the surface tension. The addition of corresponding additives, preferably alcohols, particularly preferably i-propanol, constitutes an additional embodiment of the present disclosure. In order to increase the elasticity of the PVA layer, it is preferred to add a plasticizer to the PVA solution. In this context, it is particularly advantageous to add glycerin to the PVA solution.

According to another embodiment, the fourth solution contains a fluorinated rubber, in particular a fluorinated rubber that contains the monomer 1,1-difluoroethylene. In a particularly preferred embodiment, the rubber of the fourth solution contains the monomers 1,1-difluoroethylene and hexafluoropropene. The degree of cross-linking of the fourth polymer layer dictated by step n) is limited by a maximum temperature of 100° C., thus avoiding an embrittlement of the PVA layer, making it possible to retain the flexibility of the PVA layer and of the composite material. Preferably, the cross-linking described in step n) is carried out at normal pressure for several hours, preferably at least 8 hours.

In solution dip-coating processes, i.e. dipping processes from solution, the layer thickness of the individual polymer layers depends on the dipping time, the number of individual dipping steps, and the viscosity of the solutions used for the dipping. In the process according to the present disclosure, the first rubber solution preferably has a viscosity of 850 to 1500 mPa·s, the second rubber solution preferably has a viscosity of 50 to 500 mPa·s, the fourth rubber solution preferably has a viscosity of 50 to 500 mPa·s, and/or the PVA solution preferably has a viscosity of 50 to 250 s (viscosity determined with a 6 mm Ford beaker). The occurrence of diffusion channels that reduce the protective effect of the glove can be avoided through multiple dippings in the same solution. It is therefore advantageous to carry out steps a) through c) 4 to 6 times, steps d) through f) 3 to 5 times, steps h) through j) 2 to 5 times, and/or steps k) through m) 2 to 5 times. A preferred embodiment of the present disclosure provides a process in which the polymer layers are each dipped often enough or long enough until the first polymer layer has reached a maximum thickness of 6 mm, the second polymer layer has reached a thickness of 0.05 to 0.2 mm, the PVA layer has reached a thickness of 0.05 to 0.15 mm, and/or the fourth polymer layer has reached a thickness of 0.01 to 0.05 mm. The viscosity of the solution and the dipping time are preferably selected so that in each dipping procedure, a layer thickness of 0.05 to 0.09 mm is produced. Preferably, the dipping time of the respective dipping procedures is between 40 and 200 s.

Depending on the intended use, protective gloves can have cuffs or sleeves of different lengths and shapes. Particularly in gloves with long cuffs that widen out in the direction of the glove opening, the geometry may cause different layer thicknesses in adipping procedure. It is therefore advantageous to dip the glove form at least in one dipping procedure at least one time partially and afterwards to dip it completely in order to thus compensate for the different layer thicknesses at different locations on the glove form.

It is advantageous for the dipping of the glove forms to be carried out in heatable dipping housings. It is thus possible not only to control the temperature of the respective solution, but also to have the drying procedures between the individual dipping procedures take place inside the dipping housings. Rotating the glove forms is advantageous in terms of layer uniformity since this makes it possible to avoid local differences in the layer thicknesses due to differing dripping behaviors. Compressed air can be used to remove the glove from the glove form. In addition, the protective glove has a rolled edge that makes the protective glove easier to handle. In a preferred embodiment, the rolled edge has a thickness of 2 to 5 mm. Optionally, as final steps, the gloves are cleaned and subjected to a quality control, for example through a visual inspection.

In the following, the present disclosure will be explained in greater detail in conjunction with an exemplary embodiment and with reference to the drawings; in some cases, elements that are the same or similar are provided with the same reference signs.

DETAILED DESCRIPTION OF AN ILLUSTRATIVE EMBODIMENT

Figure 1:
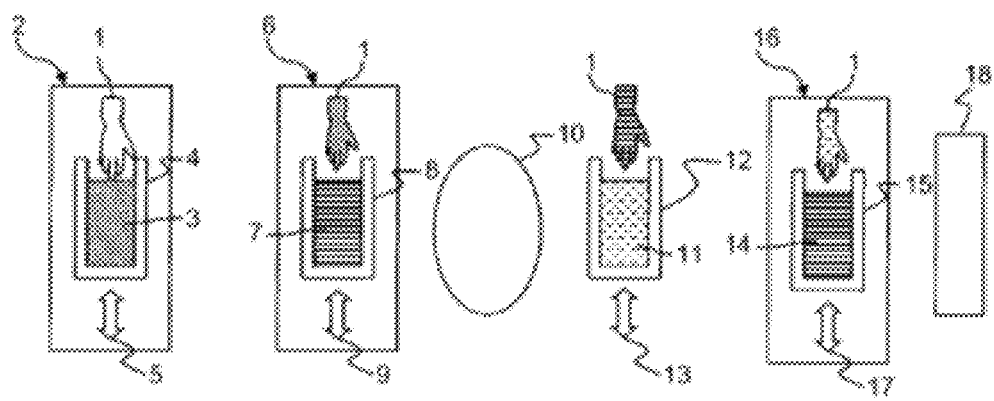
FIG. 1 is a schematic depiction of the manufacturing method according to the present disclosure.
Figure 2:
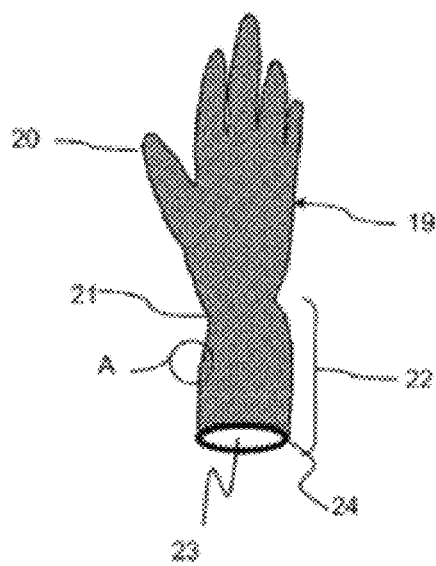
FIG. 2 is a schematic depiction of the protective glove according to the present disclosure.

FIG. 1 schematically depicts the manufacturing method for a protective glove according to the present disclosure, which will be explained in greater detail in conjunction with an exemplary embodiment. FIG. 2 is a schematic depiction of the protective glove 19 described in the exemplary embodiment. The upper part of the protective glove 19 is composed of the fingers 20, the palm, and the back of the hand and, at the wrist 21, turns into the cuff 22 of the glove, which terminates at the rolled edge 24. The inside of the protective glove 19 is labeled with the reference sign 23. The layer structure of the polymer composite material will be described in greater detail in conjunction with detail A in FIG. 3.

The method schematically depicted in FIG. 1 includes the following steps:

In a heated dipping housing 2, a glove form 1 is dipped into a dipping reservoir 4 containing a first solution 3 at a solution temperature $T_1=30°$ C. The first solution 3 contains toluene and bromobutyl rubber and has a solids content of 20%. After a dipping time of 90 s, the glove form 1 is removed from the dipping reservoir 4. To accomplish this, the lifting device 5 lowers the dipping reservoir 4. After the first dipping procedure, the glove form 1 is dried while being rotated for a period of 30 minutes at 30° C. The dipping procedure and the subsequent drying process are repeated 4 to 6 times until the bromobutyl layer has a layer thickness of 0.4 mm. To completely remove the toluene, the glove form 1 is stored at room temperature for 12 hours. In a second dipping case 6, the glove form 1 is then dipped into a dipping reservoir 8 containing a second rubber solution 7. In this instance as well, the glove form 1 is not moved, but instead the lifting device 9 moves the dipping reservoir 8. The solution 7 contains a rubber composed of the monomers 1,1-difluoroethylene and hexafluoropropene and if necessary tetrafluoroethylene. In the exemplary embodiment, a solution 7 is used, which contains a rubber that is composed of the monomers 1,1-difluoroethylene, hexafluoropropene, and tetrafluoroethylene, e.g. Viton®. Methyl ethyl ketone is used as a solvent. The solids content of the Viton® solution 7 is 20%. The temperature $T_2$ of the Viton® solution 7 during the dipping procedure is $T_2=25°$ C.

After a dipping time of 120 s, the glove form 1 is removed from the dipping reservoir 8 and is dried while being rotated for 30 minutes at a temperature of 25° C. in the dipping housing 6. The above-described dip-coting procedure in the Viton® solution 7 and the subsequent drying process are repeated 3 to 5 times until the Viton® layer, as the second polymer layer, has a layer thickness of 0.1 mm. To completely remove the methyl ethyl ketone, the glove form 1 is dried at room temperature for 12 hours. Then, the coated glove form 1 is vulcanized in an autoclave 10 for 120 minutes at a pressure of 3 bar and a temperature of 150° C. The cooled glove form 1 is then dipped into a dipping reservoir 12 containing an aqueous PVA solution 11 at a temperature of 80° C. The PVA solution has a solids content of 30% and contains 0.01 vol. % glycerin and 0.1 vol. % i-propanol.

In order to ensure a uniform layer thickness of the PVA layer, at least one dipping procedure in which the glove form 1 is dipped into the PVA solution 11 is carried out in steps. First, the glove form 1 is dipped to the wrist 21 twice and then it is completely dipped. After a dipping time of 40 s, the glove form 1 is removed from the dipping reservoir 12 with the aid of the lifting device 13 and is dried while being rotated at a temperature between 20° and 40° C., preferably at a temperature>30° C., for 10 to 40 minutes.

The dipping and drying procedures are repeated as often as necessary until the PVA layer, as the third polymer layer, has a layer thickness of 0.15 mm.

The glove form 1, is dipped once again in a heated dipping housing 16 into a dipping reservoir 15 containing a fourth solution 14 of rubber with the monomers 1,1-difluoroethylene and hexafluoropropene and if necessary tetrafluoroethylene. In the exemplary embodiment, a solution 14 is used, which contains a rubber that is composed of the monomers 1,1-difluoroethylene, hexafluoroethylene, and tetrafluoroethylene, e.g. Viton® and methyl ethyl ketone is used as a solvent. In the exemplary embodiment, the second and fourth solutions are identical so that the sequence of dipping and drying procedures also corresponds to that of the second layer and the dipping housing 16 can be identical to the dipping housing 6. But for the fourth polymer layer, the glove form 1 is only dipped into the Viton® solution twice so that a layer thickness of 0.05 mm is obtained for the fourth polymer layer. Consequently, the second and fourth polymer layers have different layer thicknesses. The second and fourth polymer layers also have different degrees of cross-linking. The fourth polymer layer is in particular more weakly cross-linked than the second polymer layer.

In order to cross-link the Viton® layer that constitutes the fourth polymer layer, the glove form 1 is dried for 12 hours in a heating oven 18 at normal pressure and at 70° C. The protective glove, which is now complete, is removed from the glove form 1 by means of compressed air and, after a cleaning, is subjected to a final visual inspection.

Figure 3:
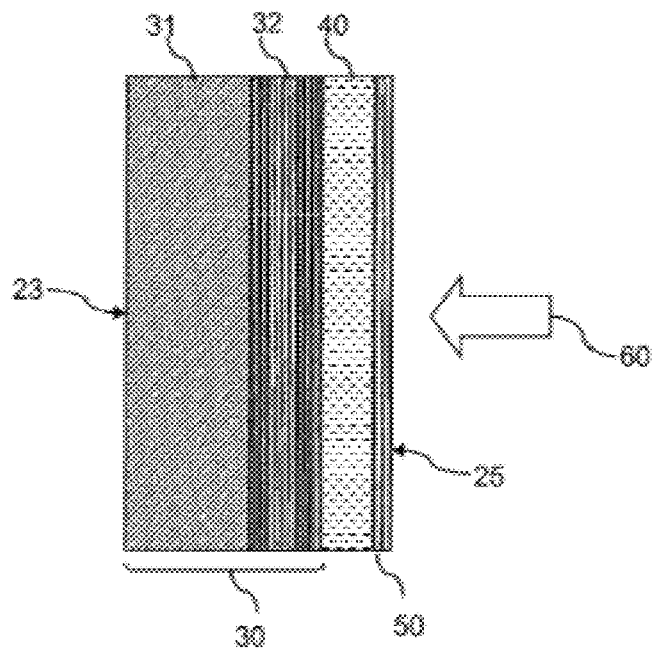
FIG. 3 is a schematic cross-section through the detail A of the protective glove according to the present disclosure.

The layer structure of the protective glove 19 manufactured using the above-described method is schematically depicted in FIG. 3; the sublayers are not shown. The protective glove according to the present disclosure and the composite material according to the present disclosure are composed of four individual polymer layers 31, 32, 40, and 50, which are situated directly one on top of another. Consequently the composite material contains no adhesive layers etc., but instead contains only layers that make a contribution to increasing the protective effect that goes significantly beyond the effect of increasing the diffusion cross-section. The first polymer layer 31 constitutes the inside 23 of the glove, the outside 25 of the protective glove 19 is the surface of the fourth polymer layer 50. The arrow 60 symbolizes the chemical action on the protective glove 19 from the outside.

In the laminate 30 of the exemplary embodiment, the second polymer layer 32 is situated directly over the first polymer layer 31. The first polymer layer 31 is composed of bromobutyl rubber and has a layer thickness of 0.4 mm. This first polymer layer provides not only a barrier effect against liquid media, but also has a very low gas permeability. Consequently, the first polymer layer protects against gases such as ammonia or hydrogen chloride. Due to its high elasticity even at low temperatures, the first polymer layer 31 can also be used with relatively large layer thicknesses without significantly compromising wearing comfort. Compared to natural rubbers such as latex, it is as the bottom polymer layer also non-allergenic. The second polymer layer 32 is composed of a fluoroelastomer with the monomers 1,1-difluoroethylene and hexafluoropropene and if necessary tetrafluoroethylene, e.g. Viton®, and has a layer thickness of 0.1 mm. The first bromobutyl layer 31 and the second Viton® layer 32 have been jointly cured and constitute the lamiante 30. This is followed directly by a PVA layer as the third polymer layer 40. This has a layer thickness of 0.15 mm. To increase the flexibility, the plastic PVA layer 40 contains the plasticizer glycerin. The fourth polymer layer 50 is composed of a fluoroelastomer with the monomers 1,1-difluoroethylene and hexafluoroethylene and if necessary tetrafluoroethylene, e.g. Viton®. The fourth polymer layer 50, whose composition is the same as that of the second polymer layer 32, constitutes the uppermost layer of the composite material. The fourth Viton® layer 50 in this case is weakly cross-linked by heating the composite material to 80° C.

The layer sequence according to the present disclosure for the dipped composite material of the protective glove 19—through a combination of the permeabilities of the polymers used, their arrangement in the composite material, and the degree of cross-linking—takes advantage of synergies, thus making it possible to achieve a protective effect that is greater than the sum of the protective actions of the individual polymer layers. The exemplary embodiment therefore not only has an excellent protective effect, but also has advantageous mechanical properties such as stability and flexibility. Table 1 shows permeabilities of the exemplary embodiment for representatives of all 12 labeling classes according to DIN EN 374. The exemplary embodiment here exhibits a permeation time of more than 480 minutes for all of the test chemicals of the 12 labeling classes. The present disclosure therefore produces a protective glove that has the protective effect 6 for all 12 labeling classes. In particular, the long permeation times for chemicals of the labeling classes D, G, H, and I—in this case dichloromethane, diethylamine, THF, and ethyl acetate—illustrate that the layer sequence according to the present disclosure does not merely make use of cumulative effects. The high permeation times for dichloromethane and THF are thus primarily due to the PVA layer. However, the permeation times for polar compounds such as diethylamine and ethyl acetate are also greater than 480 minutes. Polar compounds such as diethylamine are known to have high permeation rates in PVA. Consequently, the long permeation times of the protective glove 19 here cannot be explained solely by the barrier action of the PVA layer. Still, even protective gloves made of bromobutyl rubber and Viton® usually exhibit permeation times for diethylamine that are shorter by up to a factor of 40 than those of the protective glove 19. None of the polymer layers of the protective glove 19 alone demonstrates a barrier effect against diethylamine or ethyl acetate that is anywhere near comparable to this. It is assumed that this must result from a synergistic effect due to the structure of the composite material and the combination of the polymer layers.

This effect must therefore be considered to be not only a quantitative improvement of the protective effect, but also a qualitative improvement of it. By means of its permeation times of >480 minutes for all labeling classes, the exemplary embodiment meets the requirements for protection class 6 according to the standard DIN EN 374. In addition, the exemplary embodiment is approved as a protective glove of protection category 3, which is the highest level of safety.

TABLE 1

Permeation times

| Labeling class | Test chemical | Permeation time (min) exemplary embodiment |
|---|---|---|
| A | methanol | >480 |
| B | acetone | >480 |
| C | acetonitrile | >480 |
| D | $CH_2Cl_2$ | >480 |
| E | $CS_2$ | >480 |
| F | toluene | >480 |
| G | diethylamine | >480 |
| H | THF | >480 |
| I | ethyl acetate | >480 |

TABLE 1-continued

Permeation times

| Labeling class | Test chemical | Permeation time (min) exemplary embodiment |
|---|---|---|
| J | n-heptane | >480 |
| K | NaOH | >480 |
| L | H$_2$SO$_4$ 96% | >480 |

The additional significance of the fourth polymer layer 50, aside from its function as a moisture barrier, also becomes apparent in the flame test defined by the standard ASTM F1358. Therefore the exemplary embodiment meets the requirements of the standard, i.e. it is not flammable and is flame-resistant even though the composite material, with a bromobutyl elastomer as the first polymer layer 31, contains flammable components. This is made possible among other things by the arrangement and embodiment of the fourth polymer layer 50 as the uppermost layer and by the selection of the corresponding fluoroelastomer.

The above-described properties permit a use in sectors in which a protective glove must have a constantly high protective effect against chemicals and must also have constant mechanical properties such as flexibility over a broad range of temperatures. This includes its use for protection from cold or heat. The exemplary embodiment is suitable for use as a firefighting glove.

Figure 4:
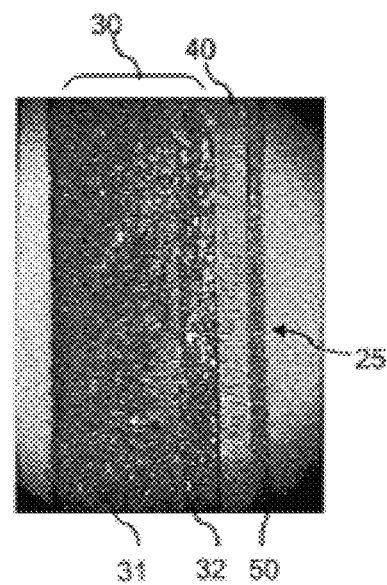
FIG. 4 is light microscopic image of detail A of the exemplary embodiment.

FIG. 4 shows an light microscopic image of the cross-section A of the above-described exemplary embodiment. The jointly vulcanized laminate 30, composed of bromobutyl elastomer and Viton®, constitutes the inside of the glove 23. The laminate 30 is followed by the PVA layer 40, which can be distinguished from both the individual layers 31 and 32 of the laminate 30 and from the Viton® layer 50. The Viton® layer 50 constitutes the outside 25 of the protective glove.

It is evident to the person skilled in the art that the above-described exemplary embodiments are to be understood merely as examples and that the invention is not limited to them, but rather can be varied in multiple ways without going beyond the scope of the invention. It is also clear that the features—regardless of whether they are disclosed in the description, the claims, the figures, or in some other way—are also individual, components of the present disclosure, even if they are described together with other features.

The invention claimed is:

1. A protective glove composed of a multi-layered polymer composite material including:
    a laminate composed of a first and second polymer layer of different synthetic elastomers, wherein the second polymer layer contains a fluorinated elastomer,
    a hydrophilic third polymer layer containing polyvinyl alcohol, and
    a fourth polymer layer containing a fluorinated elastomer, wherein said hydrophilic third polymer layer containing polyvinyl alcohol is disposed over said laminate and the fourth polymer layer is disposed over said hydrophilic third polymer layer containing polyvinyl alcohol.

2. A protective glove composed of a multi-layered polymer composite material including:
    a laminate composed of a first and second polymer layer of different synthetic elastomers, wherein the second polymer layer contains a fluorinated elastomer,
    a hydrophilic third polymer layer containing polyvinyl alcohol, and
    a fourth polymer layer containing a synthetic elastomer, wherein the hydrophilic third polymer layer containing polyvinyl alcohol is disposed over the laminate and the fourth polymer layer is disposed over the hydrophilic third polymer layer containing polyvinyl alcohol, and wherein the third polymer layer is disposed onto the laminate without adhesive agents and/or the fourth polymer layer is disposed onto the third polymer layer without adhesive agents.

3. A protective glove composed of a multi-layered polymer composite material including:
    a laminate composed of a first and second polymer layer of different synthetic elastomers, wherein the second polymer layer contains a fluorinated elastomer,
    a hydrophilic third polymer layer containing polyvinyl alcohol, and
    a fourth polymer layer containing a synthetic elastomer, wherein said hydrophilic third polymer layer containing polyvinyl alcohol is disposed over said laminate and the fourth polymer layer is disposed over said hydrophilic third polymer layer containing polyvinyl alcohol, and wherein the second polymer layer and/or the fourth polymer layer contain(s) an elastomer with the monomer 1,1-difluoroethylene.

4. A protective glove composed of a multi-layered polymer composite material including:
    a laminate composed of a first and second polymer layer of different synthetic elastomers, wherein the second polymer layer contains a fluorinated elastomer,
    a hydrophilic third polymer layer containing polyvinyl alcohol, and
    a fourth polymer layer containing a synthetic elastomer, wherein said hydrophilic third polymer layer containing polyvinyl alcohol is disposed over said laminate and the fourth polymer layer is disposed over said hydrophilic third polymer layer containing polyvinyl alcohol, and wherein the second and/or fourth polymer layer contain(s) an elastomer with the monomers 1,1-difluoroethylene and hexafluoropropene.

5. The protective glove according to claim 1, wherein the first polymer layer contains a halogenated elastomer.

6. A protective glove composed of a multi-layered polymer composite material including:
    a laminate composed of a first and second polymer layer of different synthetic elastomers, wherein the second polymer layer contains a fluorinated elastomer, and wherein the first polymer layer contains an elastomer with the monomer bromobutyl,
    a hydrophilic third polymer layer containing polyvinyl alcohol, and
    a fourth polymer layer containing a synthetic elastomer, wherein said hydrophilic third polymer layer containing polyvinyl alcohol is disposed over said laminate and the fourth polymer layer is disposed over said hydrophilic third polymer layer containing polyvinyl alcohol.

7. The protective glove according to claim 1, wherein the second polymer layer is disposed over the first polymer layer.

8. A protective glove composed of a multi-layered polymer composite material including:
    a laminate composed of a first and second polymer layer of different synthetic elastomers, wherein the second polymer layer contains a fluorinated elastomer, and wherein the laminate is composed of a polymer layer, which includes a synthetic, halogenated elastomer, and of a polymer layer, which includes an elastomer that contains 1,1-difluoroethylene and/or hexafluoropropene as monomers,
a hydrophilic third polymer layer containing polyvinyl alcohol, and
a fourth polymer layer containing a synthetic elastomer, wherein said hydrophilic third polymer layer containing polyvinyl alcohol is disposed over said laminate and the fourth polymer layer is disposed over said hydrophilic third polymer layer containing polyvinyl alcohol.

9. The protective glove according to claim 1, wherein the hydrophilic third polymer layer containing polyvinyl alcohol contains a plasticizer.

10. The protective glove according to claim 1, wherein the fourth polymer layer has a layer thickness of 0.01 to 0.05 mm, the third polymer layer has a layer thickness of 0.05 to 0.15 mm, the second polymer layer has a layer thickness of 0.05 to 0.2 mm, the first polymer layer has a maximum layer thickness of 0.6 mm, and/or the laminate has a layer thickness of 0.1 to 0.8 mm.

11. The protective glove according to claim 1, wherein the fourth polymer layer has a degree of cross-linking that is produced by heating to a maximum temperature of 100° C.

12. The protective glove according to claim 1, wherein the first and second polymer layers of the laminate are jointly vulcanized.

13. The protective glove according to claim 1, wherein the hydrophilic third polymer layer containing polyvinyl alcohol is a dipped polymer layer.

14. The protective glove according to claim 1, wherein at least one of the first, second, third, or fourth polymer layers is embodied in the form of a multiply dipped composite material that is respectively composed of two or more sublayers of the same polymer.

15. The protective glove according to claim 1, wherein the first polymer layer is composed of 4 to 6 separately dipped sublayers, the second polymer layer is composed of 3 to 5 separately dipped sublayers, the third polymer layer is composed of 2 to 5 separately dipped sublayers, and/or the fourth polymer layer is composed of 2 to 5 separately dipped sublayers.

16. The protective glove according to claim 1, having a bubble-free surface.

17. The protective glove according to claim 1, characterized in that it is flame-resistant as defined by the standard ASTM F1358.

18. The protective glove according to claim 8, wherein the polymer layer, which includes a synthetic, halogenated elastomer, includes an elastomer that contains bromobutyl as a monomer.

* * * * *